US010563699B2

(12) United States Patent
Rodriguez

(10) Patent No.: US 10,563,699 B2
(45) Date of Patent: Feb. 18, 2020

(54) ALUMINUM PROP SHAFT WITH CONSTANT VELOCITY JOINT

(71) Applicant: GM GLOBAL TECHNOLOGY OPERATIONS LLC, Detroit, MI (US)

(72) Inventor: Rolando V. Rodriguez, Metamora, MI (US)

(73) Assignee: GM Global Technology Operations LLC, Detroit, MI (US)

(*) Notice: Subject to any disclaimer, the term of this patent is extended or adjusted under 35 U.S.C. 154(b) by 187 days.

(21) Appl. No.: 15/828,506

(22) Filed: Dec. 1, 2017

(65) Prior Publication Data

US 2019/0170193 A1   Jun. 6, 2019

(51) Int. Cl.
*F16D 1/033* (2006.01)
*B60K 17/22* (2006.01)
*B60K 17/24* (2006.01)
*F16D 3/16* (2006.01)

(52) U.S. Cl.
CPC .............. *F16D 1/033* (2013.01); *B60K 17/22* (2013.01); *B60K 17/24* (2013.01); *F16D 3/16* (2013.01)

(58) Field of Classification Search
CPC .................................. F16D 1/033; F16D 3/16
See application file for complete search history.

(56) References Cited

U.S. PATENT DOCUMENTS

| 939,744 | A | * | 11/1909 | Richardson | F16D 1/033 403/183 |
|---|---|---|---|---|---|
| 2,200,641 | A | * | 5/1940 | Ricefield | F16D 3/16 464/76 |
| 2,879,092 | A | * | 3/1959 | Grobel | E21B 10/60 403/337 |
| 3,328,058 | A | * | 6/1967 | Gundlach | F16D 1/033 403/336 |
| 3,952,547 | A | * | 4/1976 | Klein | F16D 1/033 464/51 |
| 4,822,204 | A | * | 4/1989 | Lindenthal | F16D 1/033 403/337 |
| 5,472,073 | A | * | 12/1995 | Hay | F16D 1/033 192/69.6 |
| 5,651,629 | A | * | 7/1997 | Wall | F16D 1/033 403/2 |
| 5,795,231 | A | * | 8/1998 | Fukuda | F16F 1/04 267/167 |
| 6,315,487 | B1 | * | 11/2001 | James | F16D 1/027 403/270 |
| 6,364,779 | B1 | | 4/2002 | Duddy | |

(Continued)

FOREIGN PATENT DOCUMENTS

| DE | 102016015264 A1 | * | 6/2018 | ............ F16D 1/033 |
| FR | 2963649 A1 | * | 2/2012 | ............ B60K 17/22 |
| WO | WO-2011103116 A2 | * | 8/2011 | ............ B23B 31/00 |

*Primary Examiner* — Nicole T Verley

(74) *Attorney, Agent, or Firm* — Quinn IP Law

(57) ABSTRACT

A prop shaft assembly for an automotive vehicle includes a main body having a first end and a second end, the first end coupled to a first flange and a constant velocity (CV) joint assembly including a first member and a second member, the second member coupled to a second flange. The first flange and the main body are made from aluminum, the second member and the second flange are made from steel, and the first flange and the second flange are coupled together by a plurality of mechanical fasteners.

9 Claims, 2 Drawing Sheets

(56) References Cited

U.S. PATENT DOCUMENTS

| | | | | |
|---|---|---|---|---|
| 6,893,349 | B2* | 5/2005 | Krugman | F16D 3/38 |
| | | | | 464/182 |
| 7,040,992 | B2* | 5/2006 | Dine | F16D 3/2237 |
| | | | | 464/145 |
| 7,682,257 | B2* | 3/2010 | Disser | F16D 1/0858 |
| | | | | 464/182 |
| 8,187,105 | B2* | 5/2012 | Jaworowicz | F16D 1/033 |
| | | | | 29/525.01 |
| 8,257,187 | B2* | 9/2012 | Kerr | F16D 3/20 |
| | | | | 464/144 |
| 8,974,140 | B2* | 3/2015 | Durling | F16D 1/033 |
| | | | | 403/357 |
| 9,309,929 | B2* | 4/2016 | Raymond | F16D 1/06 |
| 9,593,721 | B2* | 3/2017 | Strandberg | B60K 1/00 |
| 9,664,107 | B2* | 5/2017 | Saiki | B60K 6/485 |
| 9,771,983 | B2* | 9/2017 | Marks | F16D 3/78 |
| 10,000,119 | B2* | 6/2018 | Goethe | B60K 17/22 |
| 10,132,361 | B2* | 11/2018 | Katsuragi | F16D 1/068 |
| 2016/0348731 | A1* | 12/2016 | Knuth | A01B 71/06 |
| 2017/0009812 | A1* | 1/2017 | Alcantara Burguete | |
| | | | | F16C 33/723 |
| 2018/0202534 | A1* | 7/2018 | Chunn | F16H 57/0025 |

* cited by examiner

ALUMINUM PROP SHAFT WITH CONSTANT VELOCITY JOINT

INTRODUCTION

The present invention relates generally to the field of vehicles and, more specifically, to an aluminum prop shaft coupled with a constant velocity joint.

Most vehicles include a powertrain assembly having an engine, a transmission, a driveline assembly, and driven wheels. A typical driveline assembly provides a power transfer path between an output shaft of the vehicle transmission and the driving axle assembly. Propeller shafts, drive shafts, or prop shafts which transmit power from an engine system to the wheel of an automotive vehicle are frequently constructed from one or more metal tubes connected with joints. However, joining dissimilar metals, such as aluminum and steel, is difficult and often requires an intervening member to join the dissimilar metal components.

SUMMARY

Embodiments according to the present disclosure provide a number of advantages. For example, embodiments according to the present disclosure enable a lightweight aluminum prop shaft tubing to be joined with a constant velocity (CV) joint to reduce or eliminate second order energy noise and vibration. Additionally, direct coupling of the aluminum prop shaft to the CV joint reduces the additional mass of an intervening component, such as a stub shaft, while also reducing manufacturing complexity. Embodiments according to the present disclosure optimize the use of large diameter, lightweight components to connect the CV joint to the main body of the prop shaft.

In one aspect, an automotive vehicle includes a transmission, a differential, and a prop shaft assembly connecting the transmission and the differential, the prop shaft assembly comprising a main body and a constant velocity (CV) joint assembly, the main body having a first end and a second end opposite the first end, each of the first and second ends coupled to a first flange, and the CV joint assembly including a first member and a second member. In some aspects, the first and second members are configured to rotate together and the second member is coupled to a second flange. In some aspects, the first flange is coupled to the second flange via a plurality of mechanical fasteners to interconnect the CV joint assembly with the main body of the prop shaft assembly.

In some aspects, the main body is a hollow aluminum tube.

In some aspects, the first flange is an aluminum flange having an alignment edge defining a radial alignment area.

In some aspects, the first flange and the main body are coupled together by welding.

In some aspects, the second flange includes an alignment member that abuts against the alignment edge within the radial alignment area to align the CV joint assembly and the main body of the prop shaft assembly.

In some aspects, the mechanical fasteners are balance correction members configured to balance the prop shaft assembly.

In some aspects, the second flange is formed integrally with the second member.

In another aspect, a prop shaft assembly for an automotive vehicle includes a main body having a first end and a second end, the first end coupled to a first flange and a constant velocity (CV) joint assembly having a first member and a second member. In some aspects, the second member is coupled to a second flange. In some aspects, the first flange and the main body are made from aluminum, the second member and the second flange are made from steel, and the first flange and the second flange are coupled together by a plurality of mechanical fasteners.

In some aspects, the first flange includes an alignment edge defining a radial alignment area.

In some aspects, the second flange includes an alignment member that abuts against the alignment edge within the radial alignment area to align the CV joint assembly and the main body of the prop shaft assembly.

In some aspects, the plurality of mechanical fasteners are balance correction members configured to balance the prop shaft assembly.

In some aspects, the second flange is formed integrally with the second member.

BRIEF DESCRIPTION OF THE DRAWINGS

The present disclosure will be described in conjunction with the following figures, wherein like numerals denote like elements.

Figure 1:
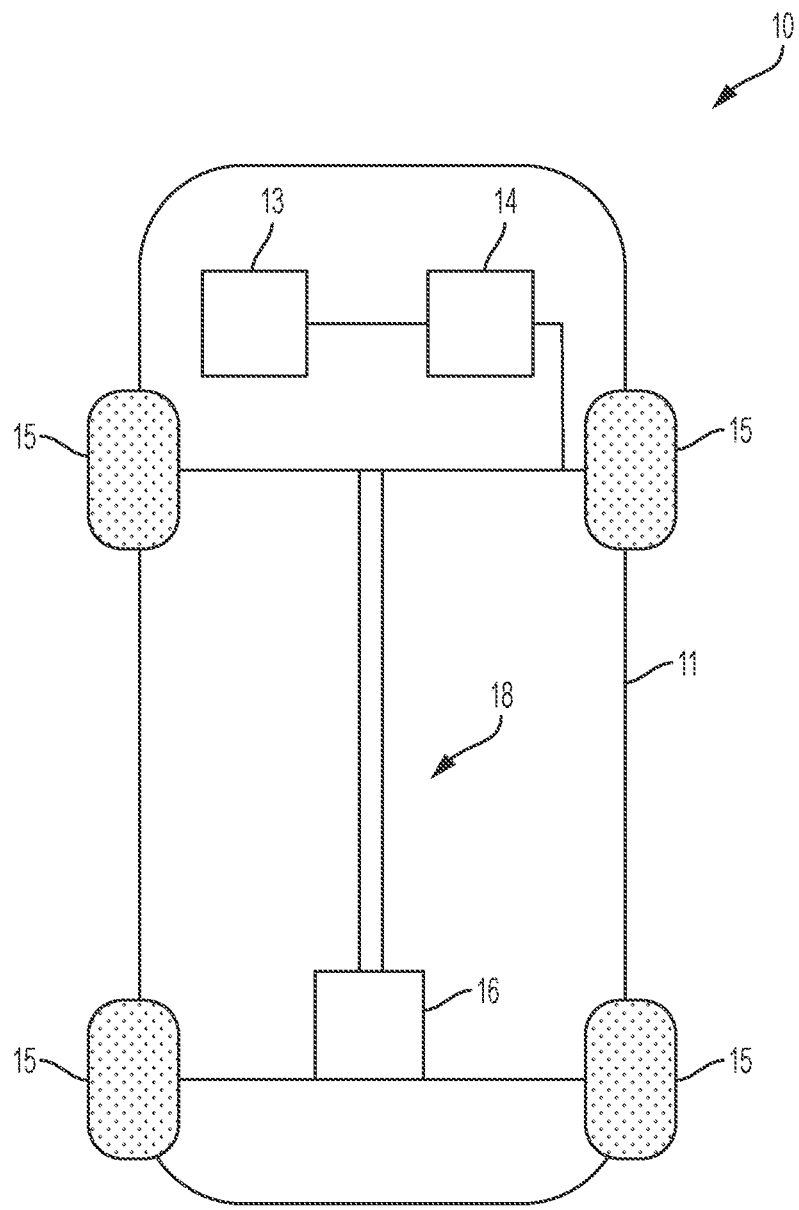
FIG. 1 is a schematic diagram of a vehicle having a prop shaft assembly, according to an embodiment.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings. Any dimensions disclosed in the drawings or elsewhere herein are for the purpose of illustration only.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

FIG. 1 schematically illustrates an automotive vehicle 10 according to the present disclosure. The vehicle 10 generally includes a body 11 and wheels 15. The body 11 encloses the other components of the vehicle 10. The wheels 15 are each rotationally coupled to the body 11 near a respective corner of the body 11. The vehicle 10 is depicted in the illustrated embodiment as a passenger car, but it should be appreciated that any other vehicle, including motorcycles, trucks, sport utility vehicles (SUVs), or recreational vehicles (RVs), etc., can also be used.

The vehicle 10 includes a propulsion system 13, which may in various embodiments include an internal combustion engine, an electric machine such as a traction motor, and/or a fuel cell propulsion system. The vehicle 10 also includes a transmission 14 configured to transmit power from the propulsion system 13 to the plurality of vehicle wheels 15 according to selectable speed ratios. According to various embodiments, the transmission 14 may include a step-ratio automatic transmission, a continuously-variable transmission, or other appropriate transmission. A propeller or prop shaft assembly 18 includes a propeller or prop shaft that transfers power from the transmission 14 to the wheels 15 via a differential 16. The vehicle 10 additionally includes wheel brakes (not shown) configured to provide braking torque to the vehicle wheels 15. The wheel brakes may, in various embodiments, include friction brakes, a regenerative braking system such as an electric machine, and/or other appropriate braking systems.

Figure 2:
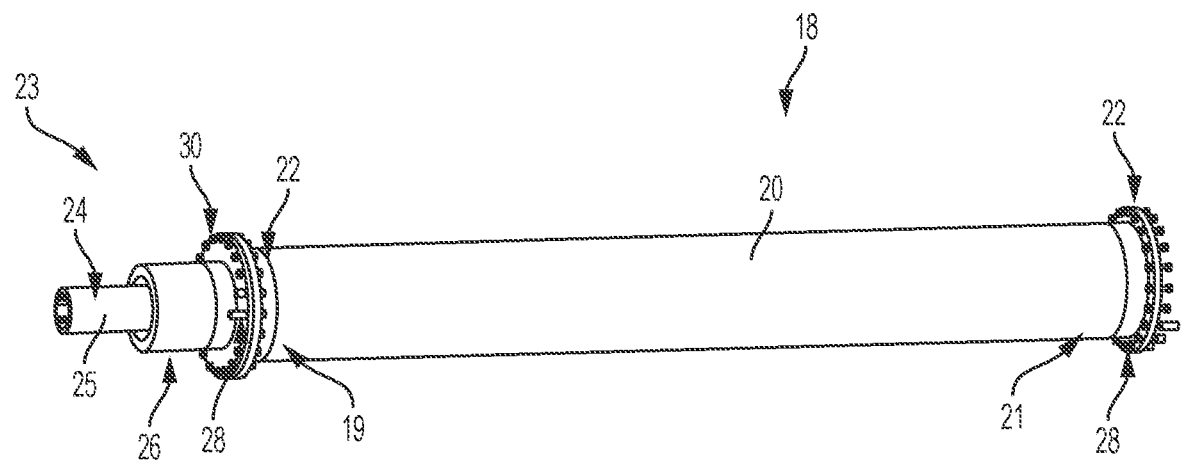
FIG. 2 is a schematic, perspective diagram of a prop shaft assembly, according to an embodiment.
Figure 3:
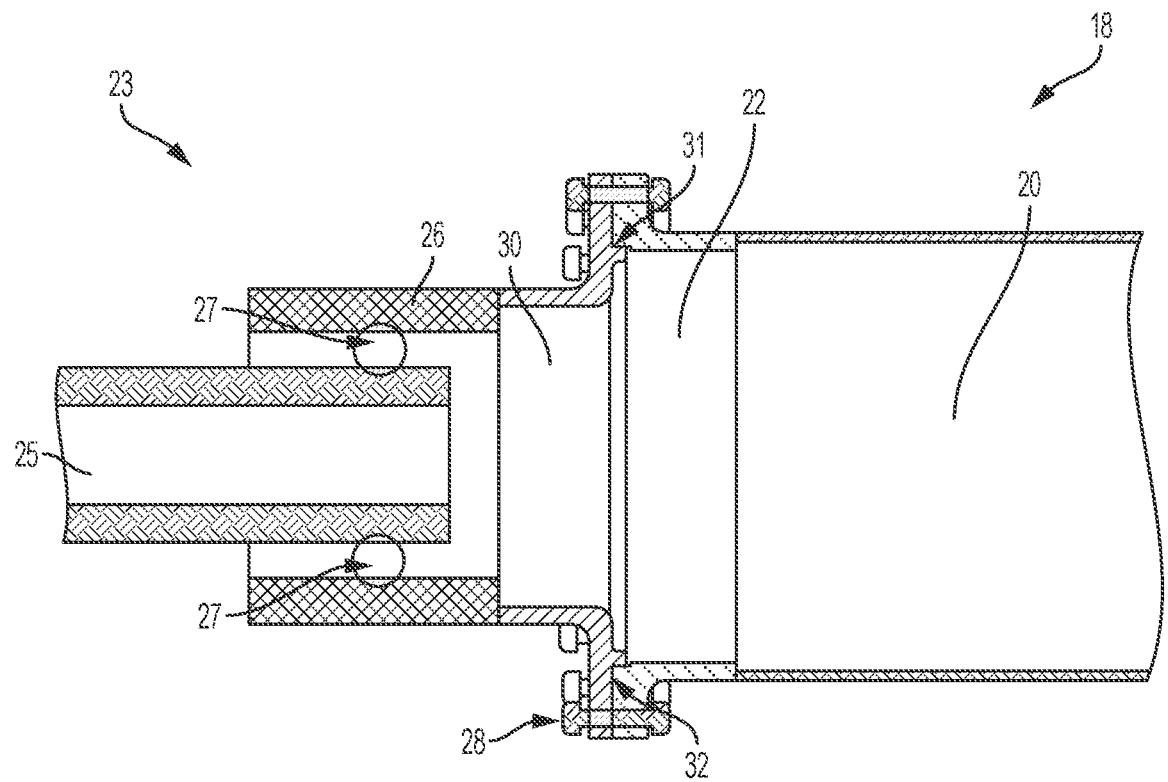
FIG. 3 is a partial cross-sectional schematic diagram of the prop shaft assembly of FIG. 2, according to an embodiment.

FIGS. 2 and 3 illustrate the prop shaft assembly 18, according to an embodiment. The prop shaft assembly 18 is part of a vehicle driveline that connects the transmission 14 with the plurality of vehicle wheels 15 via the differential 16. The prop shaft assembly 18 includes a main body 20 and a constant velocity (CV) joint assembly 23. The main body 20 is, in some embodiments, a hollow aluminum tube. The main body 20 has a first end 19 and a second end 21 opposite the first end.

As known to those of skill in the art, CV joints come in a variety of design configurations including inboard and outboard joints, fixed and plunge joints, or ball-type and tripod joints. The embodiments discussed herein may be used with any CV joint configuration.

Each of the first and second ends 19, 21 of the main body 20 is coupled to a radially-extending piloted flange 22. In some embodiments, the flange 22 includes an alignment edge 32. The alignment edge 32 defines a radial alignment area used to align CV joint with the piloted flange 22. In some embodiments, the piloted flange 22 is an aluminum flange and the main body 20 is coupled to the piloted flange 22 using any aluminum to aluminum coupling method, such as aluminum welding.

The CV joint assembly 23 allows the prop shaft assembly 18 to transmit power from the driveline through a variable angle and change in distance if the CV joint is a plunging design, at constant rotational speed, without an appreciable increase in friction. The CV joint assembly 23 includes a first member 24 and a second member 26. The first member 24 is, in some embodiments, an annular inner race having an internally-splined yoke 25. The internally-splined yoke 25 is configured to drivingly engage with other components of the vehicle driveline to transmit power from the propulsion system 13 to the plurality of vehicle wheels 15. In some embodiments, the splined yoke 25 can also be configured as an external spline if the mating components are designed with an internal spline.

The second member 26 is, in some embodiments, an annular outer race configured to engage with one or more bearing members 27. In some embodiments, the bearing members 27 are typically ball bearings. At least a portion of the first member 24 fits within the second member 26 such that an outer surface of the first member 24 engages with the one or more bearing members 27 as the first and second members 24, 26 rotate together. In some embodiments, the second member 26 is formed from steel. In some embodiments, both the first and second members 24, 26 are formed from steel.

The second member 26 also includes, in some embodiments, a radially-extending flange 30. In some embodiments, the flange 30 is made from steel. The flange 30 is coupled to the second member 26 of the CV joint assembly 23 by any coupling means including, in some embodiments including the illustrated embodiment, friction welding. In some embodiments, the flange 30 can also be formed as an integral feature of the second member 26 as a single component (that is, without welding).

The flange 30 is adapted for interconnection with the piloted flange 22. The flange 30 includes an alignment member 31. The alignment member 31 is an axially-extending pilot member that is used to align the flange 30 with the flange 22. In some embodiments, as shown in FIG. 3, the alignment member 31 abuts against the alignment edge 32 of the flange 22 to align the CV joint with the prop shaft during manufacture and assembly. In some embodiments, the roles of the pilot features are reversed (that is, the alignment member 31 could be an internal pilot).

The flanges 22 and 30 are coupled together by a plurality of mechanical fasteners 28. In some embodiments, the mechanical fasteners 28 are rivets; however, any mechanical fastener known to those skilled in the art, such as threaded fasteners, may be used to couple together the flanges 22 and 30. In some embodiments, the size, shape, and weight of the plurality of mechanical fasteners 28 are selectable to precisely add a balance correction to the prop shaft assembly 18 during manufacture. Use of removable and replaceable mechanical fasteners as balance correction members improves the fatigue strength and durability life of the prop shaft assembly 18 versus welding balance correction members to the wall of the aluminum main body 20.

The use of CV joints in the lightweight aluminum construction of the prop shaft assembly 18 reduces or eliminates second order energy noise and vibration from the driveline. Additionally, the embodiments discussed herein do not use an additional component, such as a stub shaft, to interconnect the CV joint with the prop shaft, reducing material costs and weight. Use of a stub shaft has the additional disadvantage of significantly reducing the maximum vehicle speed capability, particularly on long prop shafts, because the reduced diameter of the stub shaft reduces the prop shaft $1^{st}$ bending resonance. The embodiments discussed herein optimize the use of large diameter, lightweight components to connect the CV joint to the main body of the prop shaft.

Additionally, the embodiments discussed herein demonstrate improved first order dynamic balance noise, vibration, and harshness (NVH) performance due to the round shape of the components and the use of tight fit pilots to connect components, to improve the centering of interconnected components.

FIGS. 2 and 3 illustrate one CV joint assembly 23 coupled with the main body 20 of the prop shaft assembly 18. However, in other embodiments, a CV joint assembly 23 is coupled to each end of the main body 20 of the prop shaft assembly 18.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or slates are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternative, and is not intended to limit the selection to only those listed alternatives or to only one of the listed alternatives at a time, unless the context clearly indicates otherwise.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An automotive vehicle, comprising:
    a transmission;
    a differential; and
    a prop shaft assembly connecting the transmission and the differential, the prop shaft assembly comprising a main body and a constant velocity (CV) joint assembly, the main body having a first end and a second end opposite the first end, each of the first and second ends coupled to a first flange, and the CV joint assembly comprising a first member and a second member, the first and second members configured to rotate together, the second member coupled to a second flange;
    wherein the first flange is an aluminum flange having an alignment edge defining a radial alignment area, the second flange includes an alignment member that abuts against the alignment edge within the radial alignment area, and the first flange is coupled to the second flange via a plurality of mechanical fasteners to interconnect and align the CV joint assembly with the main body of the prop shaft assembly.

2. The automotive vehicle of claim 1, wherein the main body is a hollow aluminum tube.

3. The automotive vehicle of claim 1, wherein the first flange and the main body are coupled together.

4. The automotive vehicle of claim 1, wherein the mechanical fasteners are balance correction members configured to balance the prop shaft assembly.

5. The automotive vehicle of claim 1, wherein the second flange is formed integrally with the second member.

6. A prop shaft assembly for an automotive vehicle, comprising:
    a main body having a first end and a second end, the first end coupled to a first flange; and
    a constant velocity (CV) joint assembly comprising a first member and a second member, the second member coupled to a second flange;

wherein the first flange and the main body are made from aluminum, the second member and the second flange are made from steel, the second flange is formed integrally with the second member, and the first flange and the second flange are coupled together by a plurality of mechanical fasteners.

7. The prop shaft assembly of claim 6, wherein the first flange includes an alignment edge defining a radial alignment area.

8. The prop shaft assembly of claim 7, wherein the second flange includes an alignment member that abuts against the alignment edge within the radial alignment area to align the CV joint assembly and the main body of the prop shaft assembly.

9. The prop shaft assembly of claim 6, wherein the plurality of mechanical fasteners are balance correction members configured to balance the prop shaft assembly.

* * * * *